(12) United States Patent
Kim et al.

(10) Patent No.: US 12,441,280 B2
(45) Date of Patent: Oct. 14, 2025

(54) PEDAL SIMULATOR FOR VEHICLE

(71) Applicant: HYUNDAI MOBIS CO., LTD., Seoul (KR)

(72) Inventors: Jin Hyun Kim, Yongin-si (KR); Seong Hun Kim, Yongin-si (KR); Myeon Gyu Cha, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 18/382,662

(22) Filed: Oct. 23, 2023

(65) Prior Publication Data

US 2024/0227747 A1    Jul. 11, 2024

(30) Foreign Application Priority Data

Jan. 10, 2023 (KR) .................. 10-2023-0003412

(51) Int. Cl.
*B60T 7/06* (2006.01)
*B60T 7/04* (2006.01)
(52) U.S. Cl.
CPC ................. *B60T 7/06* (2013.01); *B60T 7/042* (2013.01)
(58) Field of Classification Search
CPC . B60T 7/06; B60T 7/042; B60T 8/409; B60T 7/04; B60T 8/4086; G05G 5/03; G05G 1/30
See application file for complete search history.

(56) References Cited

U.S. PATENT DOCUMENTS

| | | | |
|---|---|---|---|
| 9,878,694 B2* | 1/2018 | Hyodo | B60T 13/686 |
| 9,988,022 B2* | 6/2018 | Mayr | B60T 13/662 |
| 2019/0232928 A1* | 8/2019 | Adachi | B60T 11/18 |

FOREIGN PATENT DOCUMENTS

| | | | | |
|---|---|---|---|---|
| KR | 20130054860 A | * | 11/2011 | B60T 13/74 |
| KR | 20130066375 A | * | 6/2013 | B60T 13/74 |
| KR | 10-2223847 B1 | | 3/2021 | |

OTHER PUBLICATIONS

Translation of KR 2013066375 A, obtained from fit database (Year: 2011).*
Translation of KR 20130054860 A, obtained from fit database (Year: 2011).*

* cited by examiner

*Primary Examiner* — Thomas C Diaz
(74) *Attorney, Agent, or Firm* — Morgan, Lewis & Bockius LLP

(57) ABSTRACT

The present disclosure relates to a pedal simulator of a vehicle, the pedal simulator including a housing, a piston slidably disposed in the housing, an elastic part configured to elastically support the piston within the housing, and a damper provided in the piston and compressed onto the housing by a contact.

14 Claims, 7 Drawing Sheets

400

410

PEDAL SIMULATOR FOR VEHICLE

CROSS-REFERENCE TO RELATED APPLICATION

This application claims the benefit of priority under 35 USC § 119(a) to Korean Patent Applications No. 10-2023-0003412, filed on Jan. 10, 2023, the entire disclosure of which is incorporated herein by reference for all purposes.

TECHNICAL FIELD

Exemplary embodiments of the present disclosure relate to a pedal simulator for a vehicle, and more particularly, to a pedal simulator for a vehicle, which can provide a braking sense.

BACKGROUND

In general, a hydraulic system has been applied to an electro mechanical brake. Recently, as technologies related to a brake-by-wire system and an autonomous vehicle are emerging, a non-hydraulic brake system needs to be developed.

A pedal simulator is a part that is mounted on an electro mechanical brake or an electronic booster (VEB), and provides a driver with a braking sense that is generated from the existing mechanical (hydraulic) brake.

A conventional pedal simulator uses a plurality of springs and dampers in order to provide a braking sense like a mechanical booster. However, the conventional pedal simulator has problems with an increase of the number of parts and an increase of shape complexity that are required to increase similarity with the mechanical booster.

The Background technology of the present disclosure is disclosed in Korean Patent No. 10-2223847 (issued on Mar. 8, 2021 and entitled "PEDAL SIMULATOR").

SUMMARY

Various embodiments are directed to providing a pedal simulator for a vehicle, which has an optimized structure and a simplified shape.

Furthermore, various embodiments are directed to providing a pedal simulator for a vehicle, which may be applied regardless of the type and shape of a pedal.

In an embodiment, a pedal simulator for a vehicle may include a housing, a piston slidably disposed in the housing, an elastic part configured to elastically support the piston within the housing, and a damper provided in the piston and compressed onto the housing by a contact.

The piston may include a piston body disposed within the housing, a piston pressurization part provided on a first side of the piston body, and a piston rod provided on a second side of the piston body and configured to have the damper mounted thereon.

The piston pressurization part may be rotatably combined with the piston body.

The damper may be pressed in and combined within the piston rod.

The damper may include an elastically deformable material.

An opening may be provided at the end of one side of the piston rod, and the piston rod may be formed in a hollow form. The housing may include a hollow part in which the piston is movably received, a middle room that is provided on one side of the hollow part and with which the damper comes into contact or does not come into contact depending on a moving direction of the piston, and a first guide that is formed outside the middle room, that communicate with the hollow part, and into which the piston rod is inserted.

A diameter of the piston body may be formed to be greater than a diameter of the piston rod.

The elastic part may have a first side that comes into contact with the inner surface of the hollow part and a second side that comes into contact with the outer surface of the piston body, and may provide an elastic force to the piston body.

The damper may be formed in a hollow form.

The damper may further include one or more protrusions formed in an outer surface of the damper in a way to protrude therefrom.

A plurality of protrusions may be disposed in a plural number in the circumferential direction of the damper by being spaced apart from each other.

The piston may further include a projection formed in the outer surface of the piston in a way to protrude therefrom and a magnet provided within the projection.

The pedal simulator may further include a sensor provided in the housing and configured to detect a location of the magnet.

The pedal simulator may further include a second guide formed in the inner surface of the housing and configured to provide guidance to a straight movement of the projection so that the rotation of the piston is restricted.

Furthermore, the present disclosure provides a pedal simulator for a vehicle, including a housing detachably combined with a pedal, a piston slidably disposed in the housing, and a damper provided in the piston and compressed onto the housing by a contact.

The pedal simulator may further include one or more brackets provided in the housing and combined with the pedal.

A plurality of brackets may be disposed on an outer surface of the housing in a plural number by being spaced apart from each other.

The present disclosure has an effect in that a pedal return spring can be deleted through the construction of the elastic part that elastically supports the piston.

Furthermore, the present disclosure has effects in that repair and replacement costs for the pedal simulator can be reduced and productivity can be improved because the pedal simulator for the present disclosure can be used in various types of pedals in common through the modulation of the pedal simulator which may be applied regardless of the type and shape of the pedal.

Furthermore, the present disclosure has an effect in that a pedal stroke can be measured through the construction of the magnet that is provided integrally with the piston.

Furthermore, the present disclosure has an effect in that the rotation of the piston can be prevented through the construction of the guide part that provides guidance to the straight movement of) the projection including the magnet.

DETAILED DESCRIPTION

Figure 1:
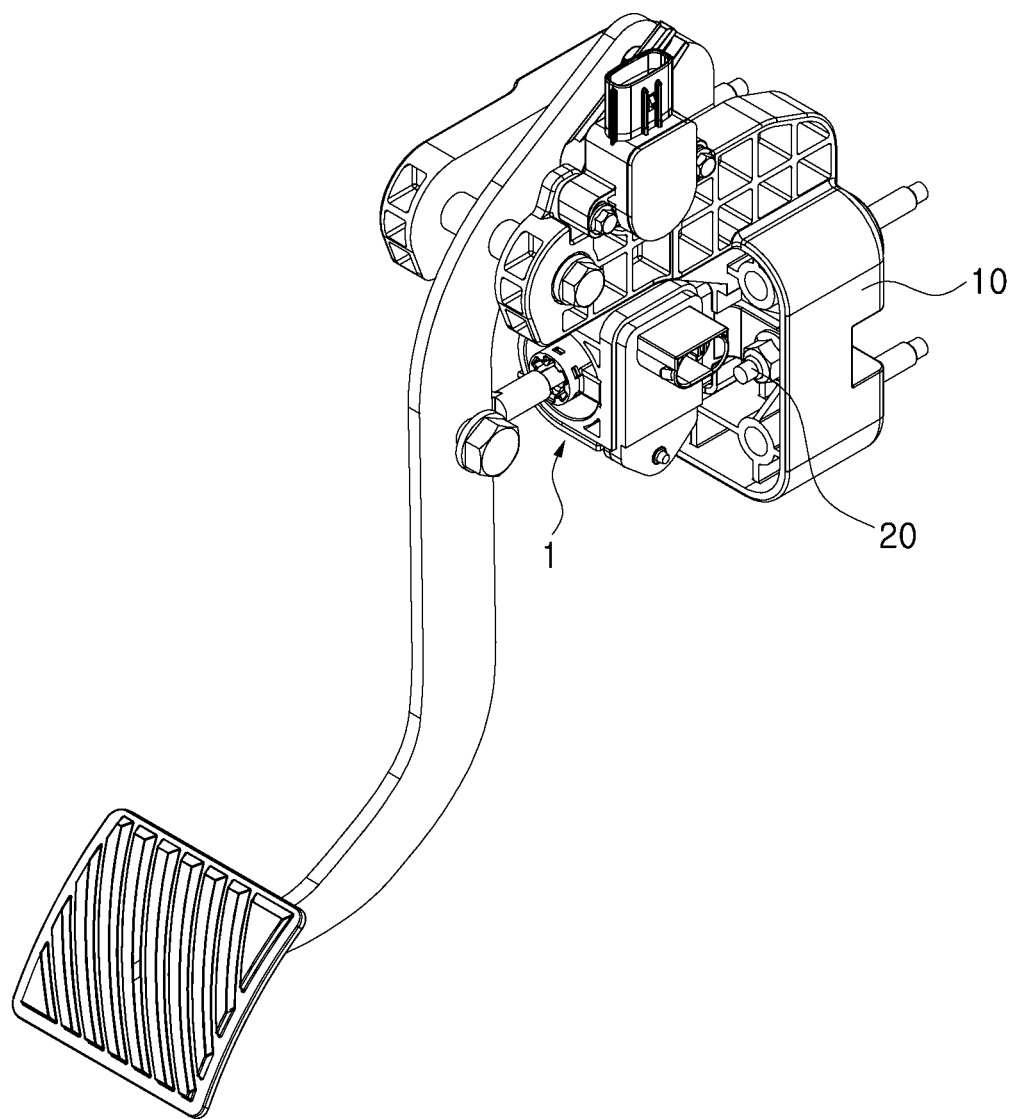
FIG. 1 is a perspective view illustrating the state in which a pedal simulator for a vehicle according to an embodiment of the present disclosure is mounted on a pendant type pedal.

Hereinafter, a pedal simulator for a vehicle according to embodiments of the present disclosure will be described with reference to the accompanying drawings. In this process, the thicknesses of lines or the sizes of components illustrated in the drawings may have been exaggerated for the clarity of a description and for convenience' sake. Furthermore, terms to be described below have been defined by taking into consideration their functions in the present disclosure, and may be changed depending on a user or operator's intention or practice. Accordingly, such terms should be defined based on the overall contents of this specification.

FIG. 1 is a perspective view illustrating the state in which a pedal simulator for a vehicle according to an embodiment of the present disclosure is mounted on a pendant type pedal.

Referring to FIG. 1, a pedal simulator 1 of a vehicle according to an embodiment of the present disclosure may be detachably mounted regardless of the type and shape of a pedal 10, such as a pendant type pedal or an organ type pedal. Accordingly, the pedal simulator 1 of the present disclosure can be modulated, can be conveniently assembled and mounted on the pedal 10, such as a pendant type pedal or an organ type pedal, and can be used in common.

In the pedal simulator 1 of the present disclosure, a bracket 160 provided in a housing 100 can be conveniently assembled by being combined with a pendant type pedal or an organ type pedal through the medium of a coupler 20, such as a bolt or a nut.

Figure 2:
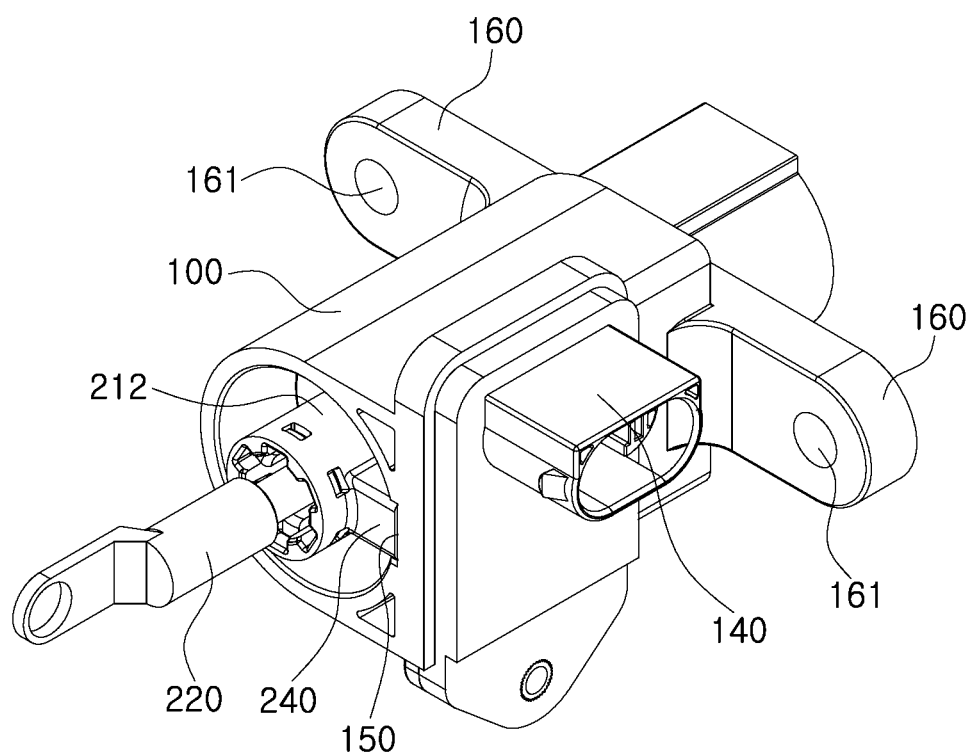
FIG. 2 is an outside perspective view illustrating the pedal simulator for the vehicle according to an embodiment of the present disclosure.
Figure 3:
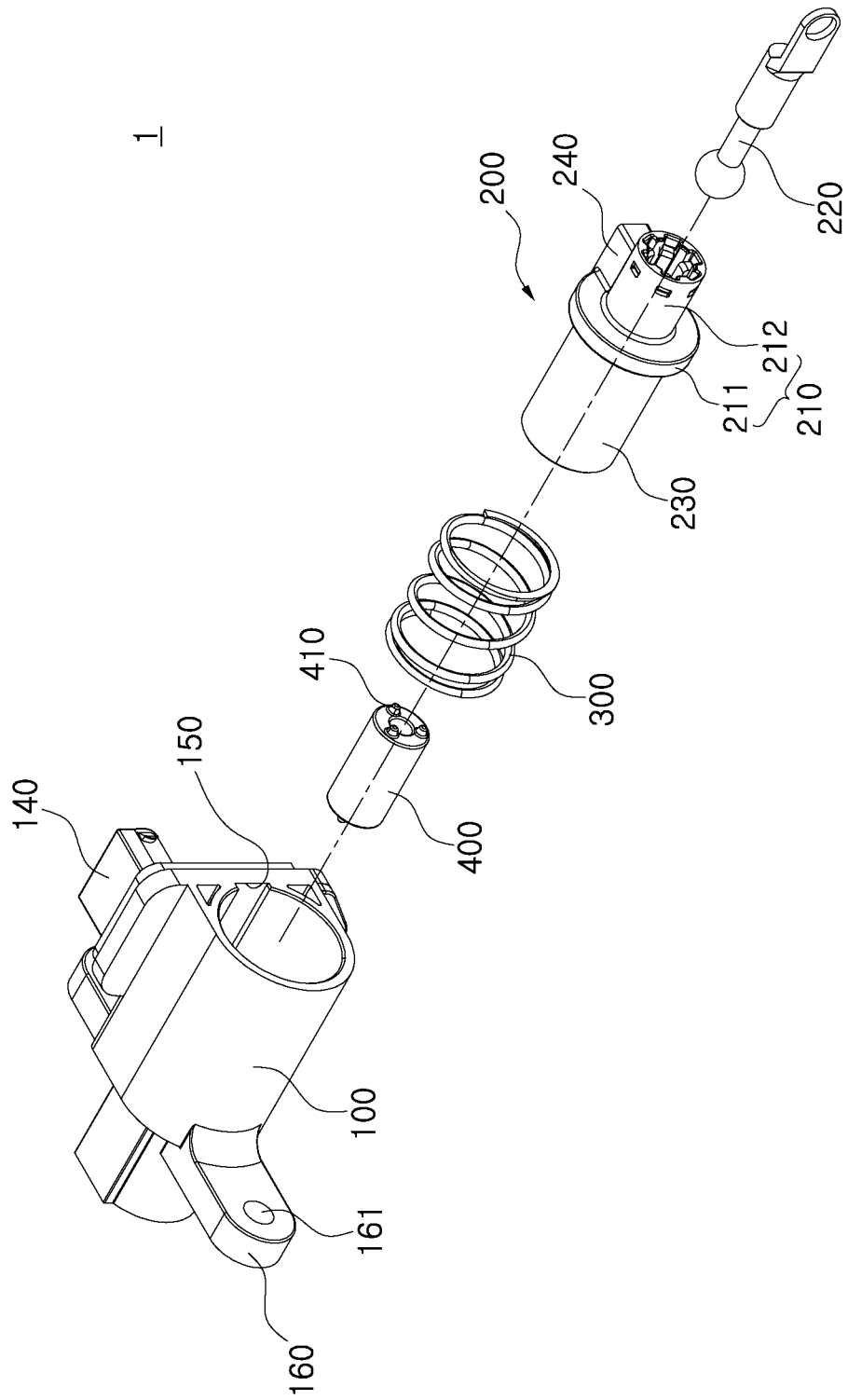
FIG. 3 is an exploded perspective view of FIG. 2.
Figure 4:
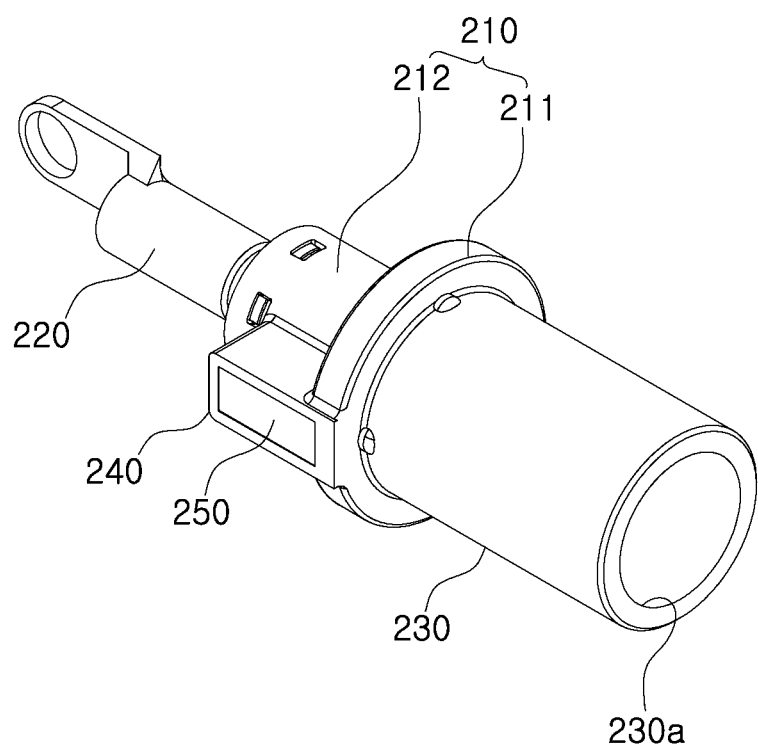
FIG. 4 is a perspective view illustrating a piston in the pedal simulator for the vehicle according to an embodiment of the present disclosure.
Figure 5:
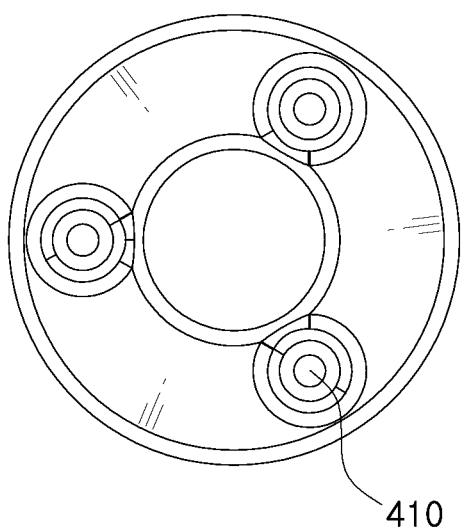
FIG. 5 is a front view illustrating a damper in the pedal simulator for the vehicle according to an embodiment of the present disclosure.

FIG. 2 is an outside perspective view illustrating the pedal simulator for the vehicle according to an embodiment of the present disclosure. FIG. 3 is an exploded perspective view of FIG. 2. FIG. 4 is a perspective view illustrating a piston in the pedal simulator for the vehicle according to an embodiment of the present disclosure. FIG. 5 is a front view illustrating a damper in the pedal simulator for the vehicle according to an embodiment of the present disclosure.

Referring to FIGS. 2 to 7, the pedal simulator 1 of the vehicle according to an embodiment of the present disclosure includes the housing 100, a piston 200, an elastic part 300, and a damper 400, which are described in detail as follows.

The housing 100 may include a hollow part 110, a middle room 120, and a first guide 130.

The hollow part 110 is provided within the housing 100, and is formed in the form of a hollow having a set length. The piston 200 described later may be movably received in the hollow part 110. Furthermore, the hollow part 110 may provide guidance to the straight movement of a piston body 210. An opening that communicates with the hollow part 110 is provided on the outer surface (the left side of FIG. 6) of the housing 100. The hollow part 110 may be formed as a groove having a cylindrical shape.

The middle room 120 is provided within the housing 100, and is provided on one side (the right side of FIG. 6) of the hollow part 110. The middle room 120 is formed in the form of a middle room shape having a set length.

The first guide 130 is provided within the housing 100, and is provided on the outside of the middle room 120. Incidentally, the first guide 130 is provided between the housing 100 and the middle room 120, and is formed in the circumferential direction of the middle room 120. The first guide 130 communicates with the hollow part 110, and may provide guidance to the straight movement of a piston rod 230 described later.

The housing 100 may be detachably combined with the pedal 10, such as a pendant type pedal or an organ type pedal. The housing 100 includes a bracket 160 that is combined with the pedal 10. The bracket 160 may be formed in the outer surface of the housing 100 in a way to protrude therefrom. The brackets 160 may be disposed in a plural number by being spaced apart from each other.

The bracket 160 may include a through hole part 161. The through hole part 161 is formed to penetrate the bracket 160. The bracket 160 is combined with a coupling hole that is formed in the pedal 10 through the medium of the coupler 20, such as a bolt or a nut, so that the housing 100 can maintain the state in which the housing 100 has been stably combined with the pedal 10 and the rotation of the housing 100 can be prevented.

The housing 100 may further include a second guide 150. The second guide 150 may be formed in the inner surface of the housing 100. Incidentally, the second guide 150 may be depressed and formed in the inner surface of the hollow part 110, and may be formed in the axial direction of the piston 200. The second guide 150 may provide guidance to the straight movement of a projection 240 that is provided in the piston 200 so that the rotation of the piston 200 moved in the housing 100 is restricted.

The housing 100 may further include a sensor 140. The sensor 140 may be mounted on the outer surface of the housing 100 in which the second guide 150 is formed. The sensor 140 may be electrically connected to a controller (not illustrated) of the vehicle, and detects the location of a magnet 250 described later.

The piston 200 is slidably disposed in the housing 100. The piston 200 may include the piston body 210, a piston pressurization part 220, and the piston rod 230.

The piston body 210 is disposed within the housing 100. Incidentally, the piston body 210 is movably received in the hollow part 110. The piston body 210 may include a planar part 211 and a rod part 212 that is formed in the outer surface of the planar part 211 in a way to protrude therefrom. The rod part 212 is formed in the form of a hollow in which an opening is provided so that the piston pressurization part 220 is inserted into the opening. In this case, the rod part 212 may be exposed through the opening of the housing 100.

The piston pressurization part 220 is mounted on a first side of the piston body 210. Incidentally, the piston pressurization part 220 is mounted on the rod part 212 that is disposed on one side (the right side of FIG. 3) of the planar part 211. The piston pressurization part 220 is moved toward one side (the left side of FIG. 3) when an external force is applied to the piston pressurization part 220.

The piston pressurization part 220 may be rotatably combined with the piston body 210 in a joint manner. Furthermore, the piston pressurization part 220 may be combined with the piston body 210 by caulking. For example, the piston pressurization part 220 that is moved by an external force can maintain the state in which the piston pressurization part 220 is rotatably combined in the rod part 212 by pressurizing and caulking the opening of the rod part 212 toward the piston pressurization part 220. Furthermore, the piston pressurization part 220 is caulked into the piston body 210, so that an assembly time and cost can be reduced.

The piston rod 230 is provided on a second side (the left side of FIG. 3) of the piston body 210. Incidentally, the piston rod 230 is formed in the outer surface of the planar part 211. The piston rod 230 may be movably received in the hollow part 110 and may be inserted into the first guide 130. The diameter of the piston body 210 may be formed to be greater than the diameter of the piston rod 230. Incidentally, the diameter of the planar part 211 may be formed to be greater than the diameter of the piston rod 230.

An opening 230a may be formed at the end (the right side of FIG. 4) of one side of the piston rod 230, which is directed toward the middle room 120. The piston rod 230 may be formed in the form of a hollow. The piston rod 230 may be formed in the form of a cylindrical shape having a set length. The damper 400 described later may be mounted on the piston rod 230.

The piston 200 may further include the projection 240. The projection 240 is formed in the outer surface of the piston 200 in a way to protrude therefrom. The projection 240 is disposed within the second guide 150. The magnet 250 may be provided on the inner surface of the projection 240. Incidentally, the magnet 250 may be inserted and ejected and integrally formed in the projection 240.

The magnet 250 may measure information on the location of the piston 200. The magnet 250 is a magnet having a magnetic force, and may transmit a pedal effort that is pressurized by the piston 200 or information on the location of the piston 200 to the controller of the vehicle through the sensor 140 based on a change in the magnetic field, which occurs as the magnet 250 is moved along with the piston 200.

The elastic part 300 elastically supports the piston 200 within the housing 100. Incidentally, the elastic part 300 elastically supports the piston 200 in the hollow part 110.

The elastic part 300 has a first side (the right side of FIG. 6) that comes into contact with the inner surface of the hollow part 110 and a second side (the left side of FIG. 6) that comes into contact with the outer surface of the piston body 210, and provides an elastic force to the piston body 210 that is moved by an external force applied to the piston pressurization part 220.

The elastic part 300 is interposed between the piston body 210 and the middle room 120, and is compressed by the piston body 210 that is moved by an external force applied to the piston pressurization part 220. The compressed elastic part 300 provides an elastic force (or an elastic restoring force) to the piston body 210 so that the piston body 210 returns to its original location. The elastic part 300 may be a coil spring that surrounds the outside of the piston rod 230.

The damper 400 is provided in the piston 200. Incidentally, the damper 400 is received within the piston rod 230. The damper 400 may be fabricated to include an elastically deformable material, and may be pressed in and combined with the inner surface of the piston rod 230 through the opening 230a of the piston rod 230. The end of one side of the damper 400 may be exposed from the piston rod 230 through the opening 230a of the piston rod 230.

The damper 400 can be conveniently assembled because the damper 400 is pressed in and combined with the piston 200. The damper 400 may include rubber, silicon, or plastic as the elastically deformable material.

The damper 400 is moved along with the piston 200 and is compressed onto the housing 100 by a contact. The damper 400 comes into contact with or does not come into contact with the middle room 120 depending of a moving direction of the piston 200. Incidentally, when the piston rod 230 moves toward the middle room 120 by an external force that is applied to the piston pressurization part 220, the damper 400 comes into contact with the outer surface of the middle room 120. When the piston rod 230 is inserted into the first guide 130, the damper 400 is compressed between the inner surface of the piston rod 230 and the middle room 120.

The damper 400 may be formed in the form of a hollow the inside of which is empty. Openings that communicate with the internal space of the damper 400 may be provided at both ends of the damper 400.

The damper 400 may further include a protrusion 410. The protrusion 410 may be formed in the outer surface of the damper 400 in a way to protrude therefrom. The protrusions 410 may be provided at both ends of the damper 400, respectively. Incidentally, the protrusions 410 may be provided on a first side (the left side of FIG. 6) of the damper 400, which is directed toward the inside of the piston rod 230, and a second side (the right side of FIG. 6) of the damper 400, which is directed toward the middle room 120, respectively. The protrusions 410 may be disposed in a plural number in the circumferential direction of the damper 400 by being spaced apart from each other.

An operating process of the pedal simulator for the vehicle having the aforementioned construction according to an embodiment of the present disclosure is described as follows.

Figure 6:
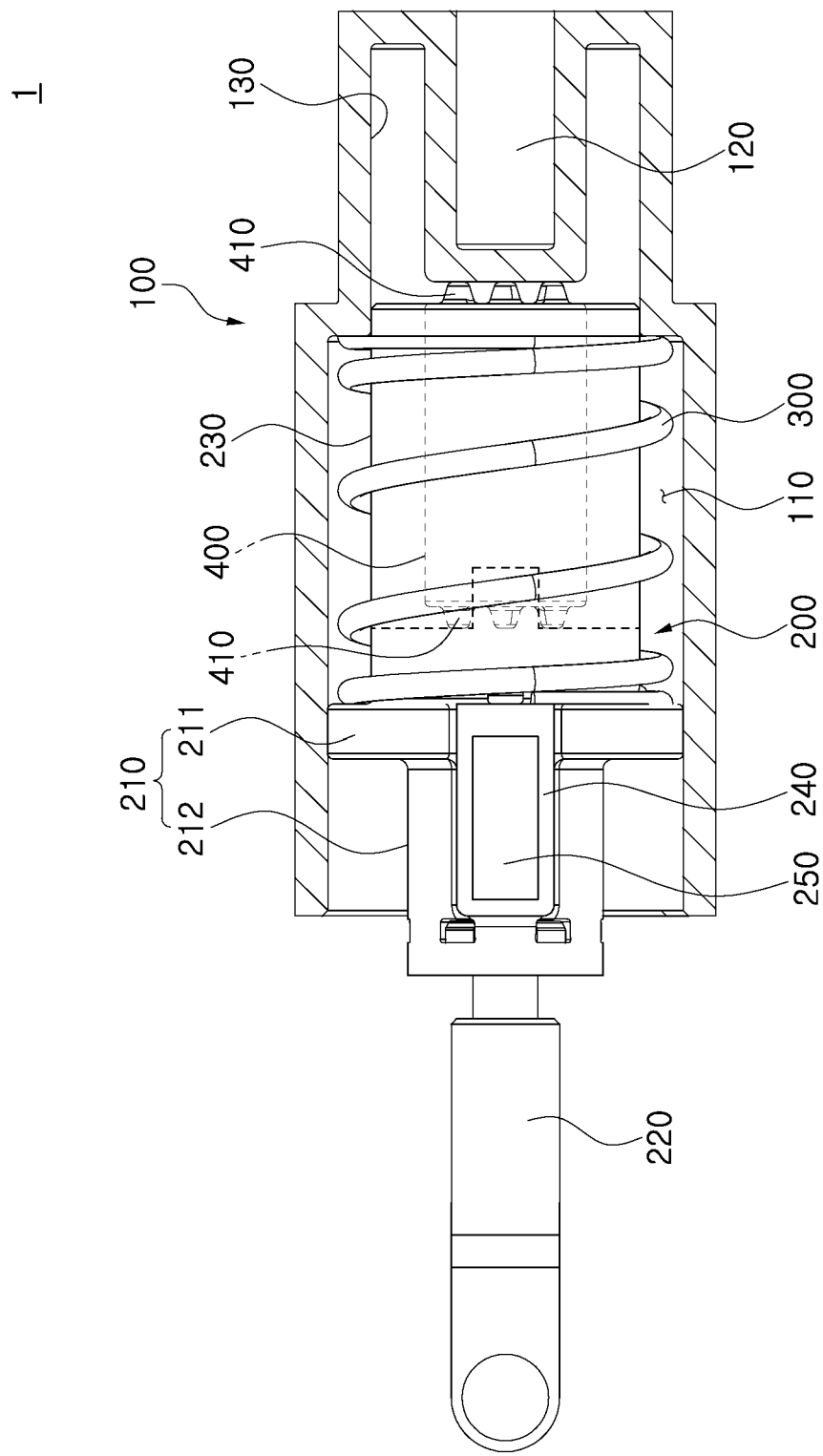
FIG. 6 is a cross-sectional view illustrating initial braking of the pedal simulator for the vehicle according to an embodiment of the present disclosure.
Figure 7:
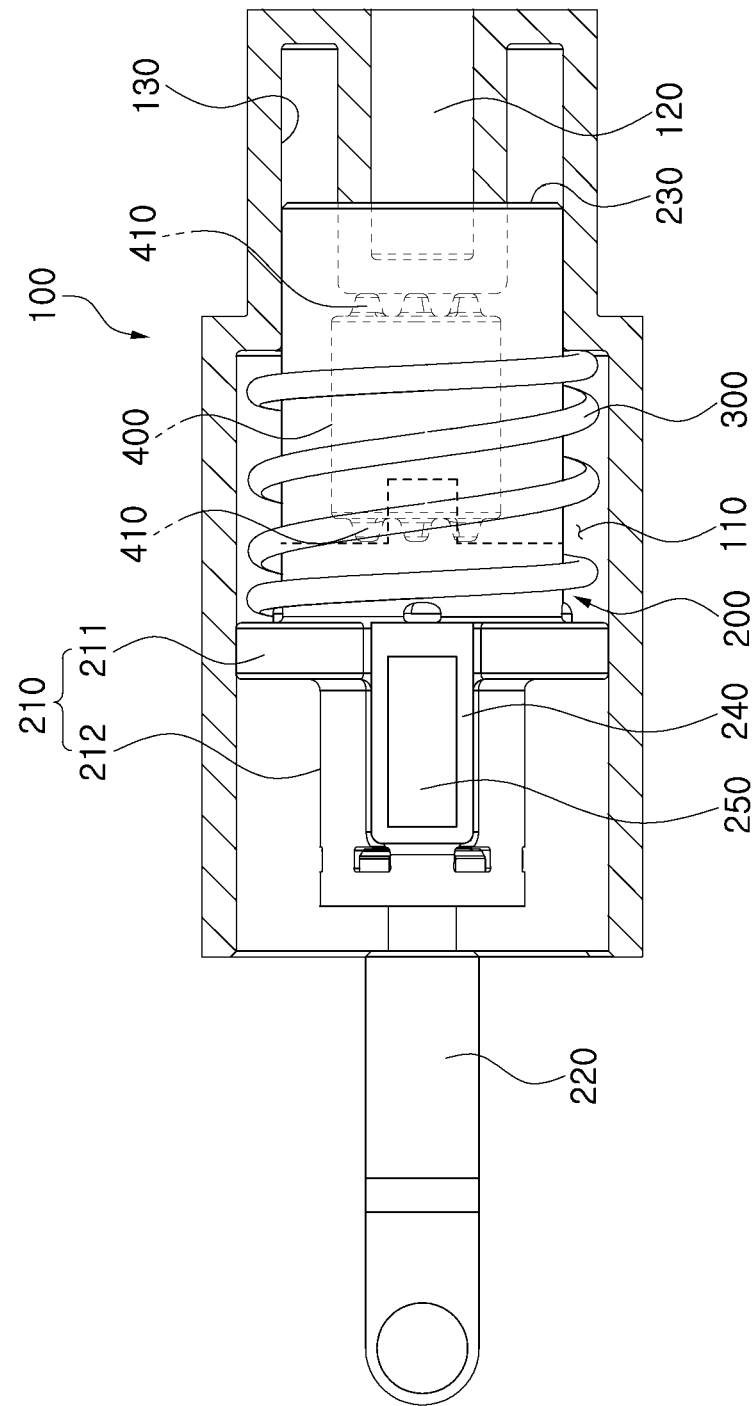
FIG. 7 is a cross-sectional view illustrating middle and late braking of the pedal simulator for the vehicle according to an embodiment of the present disclosure.

FIG. 6 is a cross-sectional view illustrating initial braking of the pedal simulator for the vehicle according to an embodiment of the present disclosure. FIG. 7 is a cross-sectional view illustrating middle and late braking of the pedal simulator for the vehicle according to an embodiment of the present disclosure.

Referring to FIG. 6, when the piston pressurization part 220 is pressurized by an external force, the piston rod 230 is moved toward the middle room 120. The elastic part 300 that is seated on the inner surface of the hollow part 110 by the movement of the piston rod 230 is compressed and deformed by the pressurization of the piston body 210. When the elastic part 300 is compressed, a user can feel an initial braking sense.

At this time, the location of the magnet 250 moved by the piston 200 is detected by the sensor 140. The sensor 140 transmits information on the location of the piston 200 or a pedal effort according to a change in the magnetic field to the controller of the vehicle.

Referring to FIG. 7, when the external force is continuously applied to the piston pressurization part 220 and the piston rod 230 is inserted into the first guide 130, the damper 400 that is moved along with the piston rod 230 is compressed onto the middle room 120 by a contact, and the user can feel a middle and late braking sense.

At this time, the location of the magnet 250 moved by the piston 200 is detected by the sensor 140. The sensor 140 transmits information on the location of the piston 200 or a pedal effort according to a change in the magnetic field to the controller of the vehicle. When the external force applied to the piston pressurization part 220 is released, the compressed elastic part 300 provides an elastic force (or an elastic restoring force) to the piston body 210 so that the piston body 210 returns to its original location.

The pedal simulator 1 of the vehicle according to an embodiment of the present disclosure may not include a pedal return spring through the construction of the elastic part 300 that elastically supports the piston 200.

The pedal simulator 1 of the vehicle according to an embodiment of the present disclosure can reduce repair and replacement costs for a product and improve productivity because the pedal simulator 1 can be used in various types of pedals (10, 20) in common through the modulation of the pedal simulator 1, which may be applied regardless of the type and shape of the pedal (10, 20).

The pedal simulator 1 of the vehicle according to an embodiment of the present disclosure can measure a pedal stroke through the construction of the magnet 250 that is integrally provided in the piston 200.

The pedal simulator 1 of the vehicle according to an embodiment of the present disclosure can prevent the rotation of the piston 200 through the construction of the guide part 150 that provides guidance to the straight movement of the projection 240 including the magnet 250.

Although exemplary embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. A pedal simulator for a vehicle, comprising:
a housing;
a piston slidably disposed in the housing, the piston including
a piston body disposed within the housing,
a piston pressurization part provided on a first side of the piston body and
a piston rod provided on a second side of the piston body and configured to have a damper mounted thereon;
an elastic part configured to elastically support the piston within the housing; and
the damper provided in the piston and compressed onto the housing by a contact,
wherein the housing includes a hollow part in which the piston is movably received, and a middle room provided on one side of the hollow part,
the elastic part is interposed between the piston body and the middle room, the elastic part is positioned completely on the piston rod regardless of a compression state of the elastic part.

2. The pedal simulator of claim 1, wherein the piston pressurization part is rotatably combined with the piston body.

3. The pedal simulator of claim 2, wherein the damper is pressed in and combined within the piston rod.

4. The pedal simulator of claim 2, wherein the damper comprises an elastically deformable material.

5. The pedal simulator of claim 1, wherein:
an opening is provided at an end of one side of the piston rod, and
the piston rod is formed in a hollow form.

6. The pedal simulator of claim 1, wherein the housing comprises:
a first guide formed outside the middle room, the first guide that communicate with the hollow part, and into which the piston rod is inserted,
wherein the middle room with which the damper comes into contact or does not come into contact depending on a moving direction of the piston.

7. The pedal simulator of claim 6, wherein a diameter of the piston body is formed to be greater than a diameter of the piston rod.

8. The pedal simulator of claim 7, wherein:
the elastic part has a first side that comes into contact with an inner surface of the hollow part and a second side that comes into contact with an outer surface of the piston body, and provides an elastic force to the piston body.

9. The pedal simulator of claim 1, wherein the damper is formed in a hollow form.

10. The pedal simulator of claim 9, wherein the damper further comprises one or more protrusions formed in an outer surface of the damper in a way to protrude therefrom.

11. The pedal simulator of claim 10, wherein a plurality of protrusions are disposed in a plural number in a circumferential direction of the damper and spaced apart from each other.

12. The pedal simulator of claim 1, wherein the piston further comprises:
a projection formed in an outer surface of the piston in a way to protrude therefrom, and
a magnet provided within the projection.

13. The pedal simulator of claim 12, further comprising a sensor provided in the housing and configured to detect a location of the magnet.

14. The pedal simulator of claim 12, further comprising:
a second guide formed in an inner surface of the housing and configured to provide guidance to a straight movement of the projection so that a rotation of the piston is restricted.

\* \* \* \* \*